United States Patent [19]

Norwood

[11] Patent Number: 5,255,767

[45] Date of Patent: Oct. 26, 1993

[54] CORD REEL LICENSE-PLATE HOLDER

[75] Inventor: Wade K. D. Norwood, Scarborough, Canada

[73] Assignee: Noma Inc., Scarborough, Canada

[21] Appl. No.: 937,338

[22] Filed: Aug. 31, 1992

[51] Int. Cl.$^5$ .................. H02G 11/02; B60R 11/00
[52] U.S. Cl. .................. 191/12.2 R; 224/273; 242/85.1; 248/52
[58] Field of Search .................. 191/12.2 R; 40/200, 40/209; 248/51, 52; 211/26; 242/85.1, 96; 224/42.03 R, 42.03 A, 273

[56] References Cited

U.S. PATENT DOCUMENTS

| | | | |
|---|---|---|---|
| 2,160,961 | 6/1939 | Dorman | 191/12 R |
| 2,449,464 | 9/1948 | Eypper | 191/12.2 R |
| 3,689,868 | 9/1972 | Snyder | 242/85.1 X |
| 4,467,979 | 8/1984 | Koehler | 242/96 |
| 4,585,194 | 4/1986 | Schwob | 191/12.4 X |
| 4,721,268 | 1/1988 | Lerner et al. | 191/12.2 R X |
| 4,778,125 | 10/1988 | Hu | 191/12.2 R X |
| 4,872,622 | 10/1989 | Mansfield | 242/85.1 |
| 5,056,698 | 10/1991 | Kozakevich | 191/12.2 R X |

FOREIGN PATENT DOCUMENTS 55-40181 3/1980 Japan .................. 191/12.2 R

Primary Examiner—Michael S. Huppert
Assistant Examiner—Scott L. Lowe
Attorney, Agent, or Firm—Kenneth M. Garrett

[57] ABSTRACT

A cord reel which also functions as a holder for a license plate of a vehicle includes a passageway therethrough. An electrical cord is captured in the passageway, conveniently by assembling the reel about the cord, whereby the cord cannot be removed from the reel, while permitting the cord to be moved along its length.

11 Claims, 2 Drawing Sheets

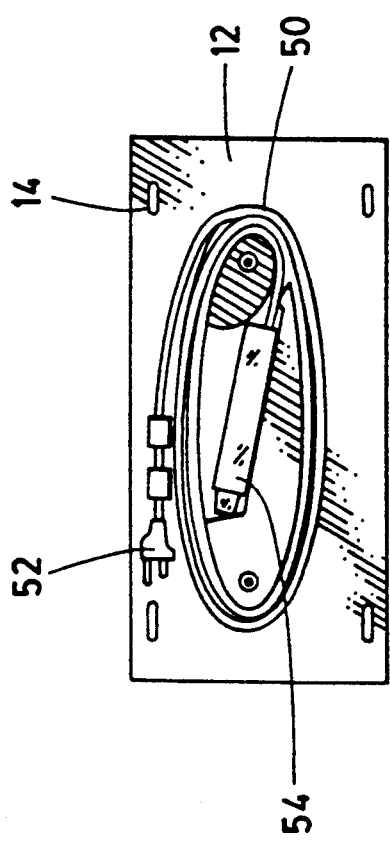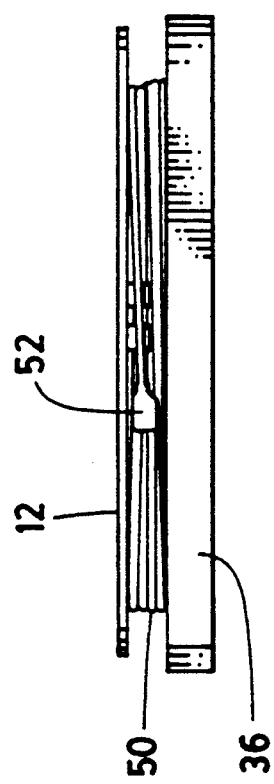

CORD REEL LICENSE-PLATE HOLDER

FIELD OF INVENTION

This invention relates to a cord reel. It particularly relates to a cord reel of the type which in use is secured to the license plate carrier of an automotive vehicle and which forms a mount for the license plate of the vehicle.

BACKGROUND OF THE INVENTION

A cord reel of the foregoing nature is described in U.S. Pat. No. 5,056,698 to Kozakevich. This cord reel comprises a hub portion and a first cheek portion secured to the hub portion, which first cheek portion is adapted to be secured to the license plate carrier of an automotive vehicle. A second cheek portion axially opposed to the first cheek portion is supported from the hub portion, the second cheek portion including means associated therewith serving as a mounting plate from the license plate of the vehicle. A cord is wrapped about the hub portion for storage purposes, and is unwound therefrom when required for use. When unwound from the reel, the cord is not secured thereto and may be inadvertently lost or stolen.

Re-winding the cord on the reel when it is completely detached therefrom tends to be a two-handed operation which is not appreciated by users particularly at sub-zero temperatures.

Electrical extension cords wound on cord reels and forming a part thereof will normally include an electrical outlet, and not uncommonly a multiple outlet connector is provided. These outlet connectors are relatively bulky and tend to act as an impediment for the cord to be wound neatly on the reel, and may at times become entangled with the cord when this is being unwound from the cord reel.

It is an object of this invention to provide a cord reel for automotive use wherein the cord is captured on the reel, but when unwound the cord is freely movable along its length.

It is another object of this invention to provide a cord reel for automotive use which is particularly adapted to facilitate the rewinding of the cord thereon.

It is still another object of this invention to provide a cord reel for automotive use which facilitates the storage of a connector portion thereon in an orderly manner and the unwinding of the cord therefrom.

SUMMARY OF THE INVENTION

In accordance with one aspect one aspect of the invention, a cord reel includes a hub portion defined in part by a peripheral wall above which the cord is wound. A passageway is provided through the hub to inter-connect peripherally spaced apart wall portions. The cord is threaded through the passageway, at least a part of which is relatively constricted, whereby it will permit the cord to pass freely therethrough along the length of the cord, while preventing the passage of the connectors located at each end of the cord, in this manner trapping the cord on the reel.

Suitably and preferably, the passageway is enlarged to form a recess into which one of the connectors may nest when the cord is to be wound about the hub.

Also suitably, the passageway is provided with an axial entrance thereto through which the cord may be threaded into the passageway, and means is provided for blocking the axial entrance. In accordance with a preferred embodiment, the cord reel is formed from two parts which are detachably secured together, one of the parts serving to block the axial entrance to the passageway when the parts are secured together.

These foregoing objects and aspects of the invention, together with other objects, aspects and advantages thereof will be more apparent from the following description of a preferred embodiment thereof, taken in conjunction with the following drawings.

BRIEF DESCRIPTION OF THE DRAWINGS

FIG. 2 shows in front elevational view the rearward portion of the cord reel of FIG. 1 with the cord wound thereon, and FIG. 3 shows the cord reel of FIG. 1 as seen from above with the cord wound thereon.

DESCRIPTION OF THE PREFERRED EMBODIMENT

Figure 1:
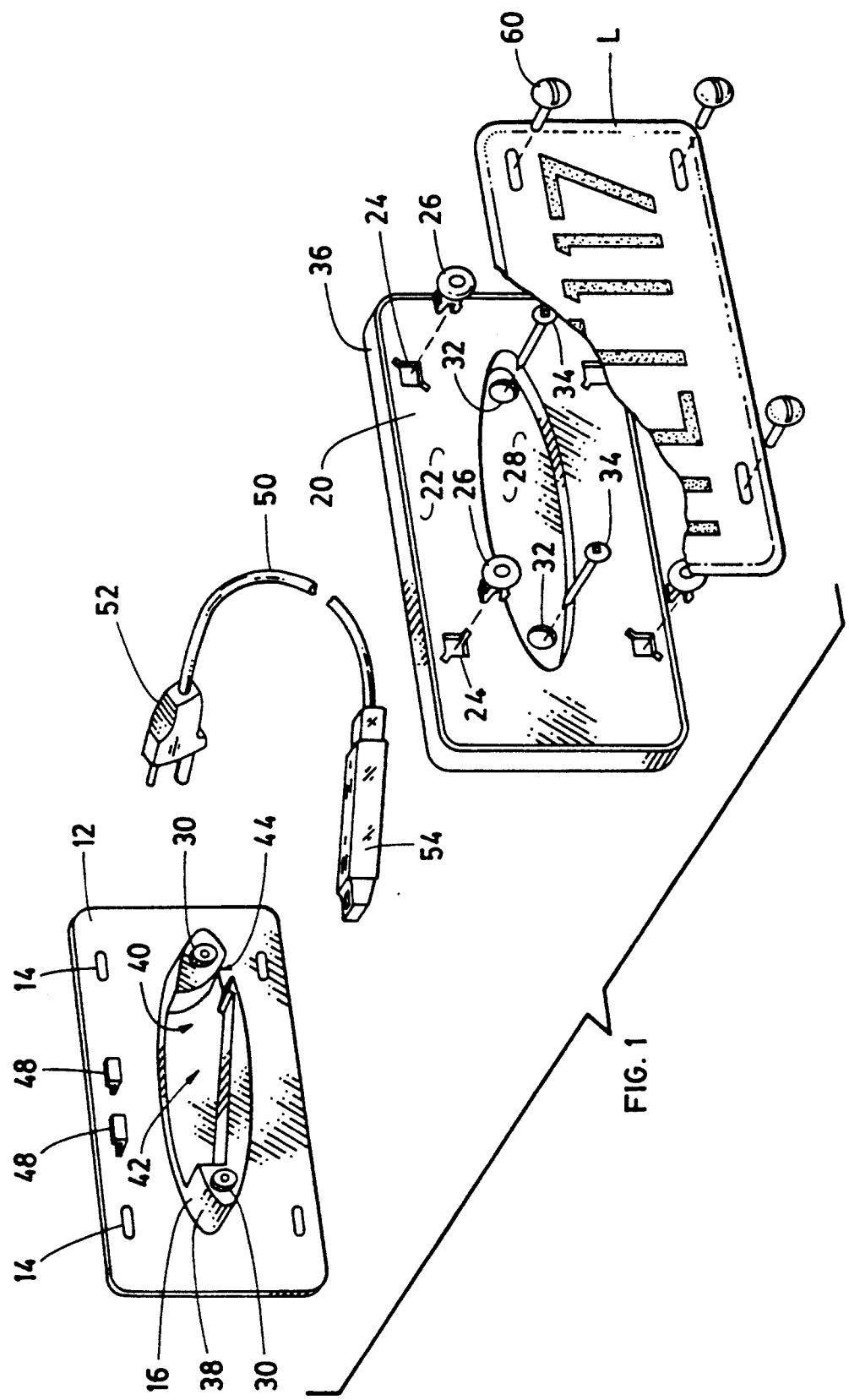
FIG. 1 shows a cord reel-license plate holder in accordance with the invention in exploded perspective view, with a cord detached therefrom, the wire portion of the cord being cut to show indefinite length, and a portion of a license plate that may be affixed to the holder.

Considering the drawings in detail, a license plate holder in accordance with the invention comprises a first generally planar cheek 12 having four slotted openings 14 adjacent the periphery thereof. A first boss portion 16 is centrally located on the forward face of cheek 12 and is integrally formed therewith. The license plate holder further includes a second cheek 20 having a major portion 22 which is generally planar and which has a complementary plan form to that of first cheek 12 and also of a standard license plate L. Four generally square openings 24 are provided in second cheek 20 adjacent the periphery thereof, into which openings are respectively secured plastic grommets 26. A second boss portion 28 having a generally complementary planform to that of first boss portion 16 is centrally located on the rearward face of cheek 20 and is integrally formed therewith. A pair of hollow dowels 30 project forwardly from first boss portion 16 and are respectively received in openings 32 provided therefor in second boss portion 28, and retained in position by screws 34 which sandwich the two boss portions together. A frame 36 surrounds second cheek 20 and projects rearwardly therefrom, the frame serving to stiffen cheek 20, to enhance the cosmetic appearance of the cord reel and also to reduce the ingress of snow and ice between cheeks 12 and 20.

First boss portion 16 is defined in part by a peripheral wall 38. A passageway 40 is formed through first boss portion 16 to interconnect peripherally spaced apart portions of wall 38. Passageway 40 is enlarged at the upper end thereof to form a relatively large, upwardly open recess 42 in boss portion 16, the lower portion of the passageway forming a relatively narrow slot 44. Passageway 40 also opens forwardly between peripherally spaced apart portions of wall 38. A pair of clips 48 are disposed on the forward surface of first cheek 12.

As normally sold in commerce, an electrical cord 50 will be assembled onto the above described cord reel in captured relation therewith. Cord 50 has opposed ends respectively terminated with a male connector 52 and female connector 54 of a conventional nature. Cord 50 is captured on the cord reel prior to the two boss portions 16, 28 being united together, which permits the cord to be introduced into passageway 40 through the above mentioned forward opening thereto. Once the cord 50 is introduced into passageway 40 in this manner, the two boss portions 16, 28 are secured together with screws 34. The narrow slot portion 44 of passageway 40 will prevent connectors 52, 54 being drawn through the passageway, while permitting relatively free movement of the cord therethrough along its length. Cord 50 will normally be coiled around boss portion 16, 28, which portions together form a hub, by pulling the cord downwardly through passageway 40 until connector 54 abuts the upper end of slot 44, at which time connector 54 will nest in recess 42. Cord 50 may then be wrapped about the hub in a single handed manner. Nested connector 54, which may be relatively bulky, preferably having an elongated rectangular cross section as illustrated to provide multiple outlets, will be generally flush with or somewhat below adjacent portions of the hub and will not become tangled in the turns of cord that are wrapped over it. The free end of cord 50, which will normally be the end adjacent connector 52, is conveniently secured by clips 48.

The cord reel of the invention will normally be secured to a license plate holder (not illustrated) of a vehicle using screws (not shown) which pass through slotted openings 14 in first cheek 12. Similarly the license plate L of a vehicle will normally be secured to second cheek 20 by screws 60 retained in plastic grommets 26.

It will be apparent that many changes may be made to the illustrative embodiment, while falling within the scope of the invention and it is intended that all such changes be covered by the claims appended hereto.

I claim:

1. In a cord reel forming a license plate carrier for a vehicle, said reel including:
    a hub portion having an axis and a peripheral wall, a pair of cheeks respectively disposed adjacent the axial ends of said hub portion,
    one of said pair of cheeks being adapted to mount said cord reel to a license plate holder of said vehicle, the other of said pair of cheeks being adapted to carry a license plate for said vehicle,
    an electrical extension cord coiled about said hub portion, said cord having connectors at opposed ends thereof;
    the improvement wherein said hub portion is provided with a passageway therethrough interconnecting peripherally spaced apart portions of said peripheral wall, and wherein said cord is threaded through said passageway, at least a portion of said passageway being dimensioned so as to prevent the passage of either of said connectors therethrough while permitting the cord to be drawn therethrough along the length of the cord, thereby trapping said cord on said reel.

2. A cord reel as defined in claim 1, wherein said passageway is enlarged adjacent one end thereof to provide a recess for one of said connectors to nest therein.

3. A cord reel as defined in claim 1, including clip means disposed on one of said pair of cheeks for gripping said cord.

4. A cord reel as defined in claim 1, wherein said passageway is provided with an axially oriented entrance thereto to permit said cord to be threaded into said passageway, and means is provided for blocking said axially oriented opening.

5. A cord reel as defined in claim 4, wherein said hub portion comprises at least two parts detachably secured together, one of said parts serving as said means to block said axially oriented entrance when said parts are secured together.

6. A cord reel for mounting between a license plate and a license plate holder of a vehicle comprising:
    a first cheek adapted for securing to said license plate holder;
    a second cheek adapted for supporting said license plate;
    a central hub extending between said cheeks;
    said hub having a passageway extending between peripherally spaced apart portions thereof; and
    an electrical cord threaded through said passageway;
    said cord having opposed ends, each said end having a connector thereon;
    said passageway being dimensioned to permit said cord to be pulled therethrough along the length thereof while preventing the passage of a connector therethrough, and
    said cord thereby being trapped on said reel.

7. A cord reel as defined in claim 6, including clip means disposed on one of said first or second cheeks for detachably securing a portion of said cord to said cheek.

8. A cord reel as defined in claim 6, wherein said hub is formed by two boss portions, each boss portion being unitarily formed with a respective one of said first and second cheeks, and wherein means are provided for detachably securing said boss portions together.

9. A cord reel as defined in claim 8, wherein said passageway is enlarged at one end thereof to provide a recess for one of said connectors to nest therein.

10. A cord reel as defined in claim 8, wherein one said boss portion is provided with an axial entrance in communication with said passageway, through which said cord can be threaded into said passageway, the other said boss portion serving to block said axial entrance when said boss portions are secured together.

11. A cord reel as defined in claim 10, wherein said passageway is enlarged at one end thereof to provide a recess for one of said connectors to nest therein.

* * * * *